United States Patent Office 3,707,499

Patented Dec. 26, 1972

3,707,499

DIELECTRIC MATERIALS

Daniel W. Mason, West Peabody, Mass., and Henry H. Nester, deceased, late of Peabody, Mass., by Dianne L. Nester, special administratrix, Gloucester, Mass., assignors to Owens-Illinois, Inc.

No Drawing. Filed June 5, 1970, Ser. No. 43,941
Int. Cl. C04b *35/00;* H01b *1/06, 3/02*
U.S. Cl. 252—63.5 S 8 Claims

ABSTRACT OF THE DISCLOSURE

A dielectric material is formulated by firing an admixture of from about 2–55% by weight zircon (zirconium silicate) and about 45–98% by weight of a lead barium borosilicate glass. In final form, the dielectric material exhibits a low K (approximately 6) and a high Q value. The paste composition is formulated by admixing the aforementioned ingredients in an organic vehicle, drying the paste and firing the paste at a temperature of from about 800–1,000° C. The paste is usually applied by a screen printing technique preferably using a mesh size in the range of about 165.

This invention relates to dielectric materials. More particularly, this invention relates to dielectric pastes and materials made therefrom by thick film applications which are useful as capacitor dielectrics, crossover materials and multilayered dielectrics.

Dielectric materials most desirable for these described uses exhibit a low dielectric constant (K) and a high Q value. Q is the reciprocal of dissipation factors. Generally speaking, the art has turned to the area of devitrifiable glasses to achieve the necessary values of these desired properties. As is readily understood in the art, devitrifiable glasses have attendant therewith serious problems which affect both the technology and the economics of the system. That is to say, in order to form a devitrifiable glass into a dielectric material, a delicate time-temperature mechanism must be effected in order to change the glass from its amorphous or vitreous state into its crystalline or partially crystalline state. Such a delicate time-temperature mechanism usually requires at least two heat delay steps which include a holding period at a nucleation temperature and a further holding period at a higher crystallization temperature. Not only does such a delicate mechanism require added expense, but it also places a definite limitation due to its delicate nature upon the reproducibility of the final product. A further problem with respect to these devitrifiable compositions is that when they are fired, they must go through a glassy state which tends to flow and therefore which, at least in part, destroys the resolution or definition of any printed lines into which the material is formed.

It is a purpose of this invention to overcome the problems attendant with devitrifiable dielectric materials by providing the art with a unique dielectric composition which may be formed into a dielectric material having a low K and high Q value and which does not require that it be converted by devitrification techniques into a crystalline material in order to achieve the necessary values of these desirable properties. Rather, because of the uniqueness of this dielectric composition, it is quite able to withstand refiring without physical or electrical change and without exhibiting any substantial flow. Thus printed lines formed from the compositions of this invention maintain their resolution even after refiring. In addition, reproducibility is extremely high in view of the fact that the material is capable of being fired by a simple heat step at temperatures of about 800° to 1,000° C. or even refired at these temperatures.

The term "fired" as used herein is a term well known in the art. This term is generally defined by the art as a heating step wherein sufficient heat is applied for a sufficient period of time to change a particulate composition into a generally solid glass-like dielectric material.

Basically, the dielectric compositions contemplated by this invention comprise about 2–55% by weight of a ceramic powder, preferably zircon (zirconium silicate) with about 45–98% by weight of a lead barium borosilicate glass binder. While the particle size of the ceramic may range from about 0.1 to about 20 microns, it is preferable for the purposes of this invention to use an average particle size of zircon in the range of about 0.1–0.5 micron and still more preferably in the range of less than about 0.2 micron. Similarly, the particle size of the glass admixed with the zircon to formulate the dielectric compositions of this invention may, before firing, be in a range of about 0.1 to about 20 microns but most preferably are provided in a range of approximately about 0.5–1.0 micron. By using the preferred ranges of average particle size as cited, a smooth film having the desirable low K, high Q values is insured.

Any well known ceramic powder may be used which will render the resultant material a dielectric. Examples of such include $Al_2O_3$, devitrified glass particles, zirconium silicates generally, including $BaZrSiO_4$, $MgZrSiO_4$, $ZnZrSiO_4$ and the like, $TiO_2$ and $ZrO_2$. As stated, zircon ($ZrSiO_4$) is preferred for purposes of this invention.

The dielectric compositions of this invention, as described, are most preferably useful as crossover dielectrics and thus, such a use contemplates a preferred use in accordance with this invention. Regardless of the use to which these dielectric compositions are actually put, they are generally first formulated into a particulate blend and thereafter into a printing paste which is printed upon the desired area and fired into a dielectric glass-like material with or without a conductive source being present.

In order to form the pastes as described above, the basic admixture of powders of the glass binder and zircon particles in the appropriate particle sizes are dry blended and well mixed by adding them to a suitable organic carrier vehicle. For purposes of this invention, the preferred organic carrier vehicle which has found particularly good working characteristics in the subject environment consists of 2½% by weight of ethyl cellulose admixed with an organic thinner consisting of about 2 parts by weight butyl carbitol acetate and 1 part by weight isoamyl salicylate. Any of the other conventional paste vehicles well known in the art are also generally suitable and therefore may be employed if desired.

The paste may generally be formulated within a wide range of ingredients depending upon the ultimate use to which the product is put and the degree of resolution of the printing desired. For example, the paste may be formulated with about 50–90% by weight solids to 50–10% by weight liquid organic carrier vehicle. Preferably, however, the paste will consist of by weight, about 60–70% solids and from about 40–30% liquid organic vehicle.

An example of a particularly preferred paste composition in accordance with the teachings of this invention consists of 25.0% by weight of zircon having an average particle size of about 0.2 micron and from about 75.0% by weight of a lead barium borosilicate glass consisting of 37% by weight $SiO_2$, 10% by weight $B_2O_3$, 13% by weight $Al_2O_3$, 15% by weight PbO, 2% by weight $TiO_2$ and 23% by weight BaO. These ingredients are then admixed with the above described preferred vehicle in an amount by weight of 66.7% solids and 33.3% liquid organic carrier vehicle. In this preferred composition, the average particle size of the glass is about 0.7–0.9 micron.

For thick film applications, the above-described paste compositions are then printed by well-known screen printing techniques such as by using a screen mesh of preferably approximately 165 to 200 or greater. After the printing, which may be a single printing, or a double coat of the paste, the dielectric material is air dried at a temperature of from about 100° C. to 125° C. for a period of from 5 to 20 minutes. Temperatures as low as room temperature with extended periods of time may also be used for drying. After drying, the layer is then subjected to a firing temperature of approximately 800–1000° C. and preferably about 875 °C. for about 4–10 minutes and preferably about 5 minutes at peak temperature with 8 to 10 minute heat-up and cool-off periods.

Films formed in accordance with the above description generally have a thickness of about 1.5 to 1.8 mils. Preferably, a typical procedure, especially preferred for the purposes of this invention, may be illustrated as follows: Print-Dry-Print-Fire-Print-Dry-Apply Top Conductor-Dry-Fire. The top conductor used may be of any well-known type such as a paste of Pd-Au, Pd-Ag, and the like admixed with a conventional organic carrier vehicle. Although it is preferred to fire the top conductor simultaneously with its dielectric lamina, such is not necessary and if the situation dictates, it may be fired separately. Since the dielectric lamina of this invention, as described above, are refirable, no adverse effects result from separate firings.

As stated hereinabove, the dielectric materials formulated in accordance with the above exhibit extremely low K values and high Q values. K values may be as low as 4–6 and in any event are usually lower than 10. This represents a significant difference over the prior art which generally is not able to obtain K values lower than about 11 or 12. In addition, the dielectric materials of this invention are inert to refiring cycles in that they retain their electrical properties and physical definitions upon refiring. The dielectric materials of this invention, furthermore, exhibit excellent dielectric strength usually greater than about 1,000 volts per mil and exhibit excellent screenability, definition and rheological shelf life. The Q factors generally achieved are very high comparable to the prior art and generally are represented in reciprocal by low dissipation factors (of less than about 0.002 at 25° C. and 1 kHz.). In addition, the materials are dense, fired structures which are extremely high in quality.

While the above materials have been described with respect to their usefulness as crossover dielectrics, it is also understood that they can be used in multisheet capacitance dielectrics as well as in multilayer materials. In the art of multilayer materials such as in the formation of hybrid multilayer dielectric boards and the like, the property of solderability is usually of paramount importance. Solderability, as is well known, is the ability to solder a lead to a conductor which has previously been formed by firing it upon a dielectric layer. Solderability is usually negated by the dielectric, during conductor firing, wetting the solderable surfaces of the conductor and thus providing at such surfaces a material to which a lead element cannot be soldered.

The dielectric materials of this invention may be used in multilayer devices which at the same time achieve solderability by altering the above-described procedure by which the conductors are fired on the dielectric material. That is to say, the conductors are fired separately rather than simultaneously and at lower temperatures than those used to fire the dielectrics in order to prevent wetting of the conductors for solderability purposes. Generally speaking, these lower temperatures are below about 800° C. and should preferably be as low as conductor firing will allow. When this is accomplished, extremely useful dielectrics in multilayer devices which allow for the solderability of the conductors in the devices is achieved. Thus, while the above procedure must be altered to the extent that the conductors must be fired separately and at lower temperatures than those at which the dielectric materials are fired so as to achieve solderability, the subject inventive concept still presents an important improvement over the prior art which had to rely upon the delicate mechanism of devitrification to obtain a workable dielectric material.

The following examples are presented by way of illustration rather than limitation.

EXAMPLE 1

A dry blend is formulated consisting of by weight 25% zircon having an average particle size of about 0.2–0.8 micron and 75% of a glass binder consisting of 37% $SiO_2$; 10% by weight $B_2O_3$, 13% by weight $Al_2O_3$; 15% by weight PbO; 2% by weight $TiO_2$ and 23% by weight BaO and having an average particle size of about 1.0 micron. The dry blend is formed into a paste by admixing 66.7 parts by weight thereof with 33.3 parts by weight of a liquid organic vehicle consisting of 5% by weight ethyl cellulose and 95% by weight of a thinner consisting of 2 parts by weight butyl carbitol acetate and 1 part by weight iso-amyl salicylate.

This paste is then printed over a previously formed conductor consisting of Pd-Au. Printing is accomplished by using a screen printer having a mesh size of 165 and applying three coats of the paste with a drying period of 15 minutes at about 125° C. between two coats.

A Pd-Au paste conductor is formulated by admixing particles of a Pd-Au conductor powder having an average particle size of 2–3 microns and consisting of 70.4% by weight Au, 17.6% by weight Pd, 8.0% by weight $Bi_2O_3$, and 4.0% by weight of a glass binder consisting of 17.6% by weight $SiO_2$; 16.0% by weight $B_2O_3$; 0.4% by weight $Al_2O_3$; 60.0% by weight PbO; and 5.9% by weight CdO; with a liquid organic vehicle consisting of 20% by weight ethyl cellulose and 80% by weight thinner consisting of 2 parts by weight butyl carbitol acetate and 1 part by weight iso-amyl salicylate. The paste is formulated of 75% by weight Pd-Au powder and 25% by weight liquid organic vehicle.

The conductor paste is then screen printed over the previously screened and dried dielectric layer by using a screen mesh of 200. The conductor layer is then dried similarly as the dielectric layer.

The composite consisting of the dielectric layer and the conductor layer is now fired at a temperature of 875° C. at peak for 5 minutes with 8 minute heat-up and cool-down periods. The resultant composite consists of two conductors having interposed therebetween an insulating crossover dielectric lamina exhibiting a dielectric constant of about 6 and a reciprocal Q value (i.e. dissipation factor) of les than 0.002 at 25° C. and 1 kHz. The crossover dielectric lamina during firing wetted the upper conductor rendering it nonsolderable.

EXAMPLE 2

Using the dielectric paste formulated, screened and dried onto a previously prepared Pd-Au conductor as described in Example 1. The dielectric paste without first printing a top conductor thereon was then fired at a temperature of 875° C. at peak for 5 minutes with 8 minute heat-up and cool-down periods.

Therefore, the conductor of Example 1 is printed and dried as described in the aforementioned example over the now fired dielectric. In order to obtain a solderable (bondable) upper conductor, the printed and dried conductor composition is then fired at a temperature of 700° C. which is significantly below the firing range of the fired dielectric lamina. The resulting composite exhibits the same effective dielectric properties as described in Example 1. In addition, an electric lead soldered to the upper conductor forms a tenacious bond therewith thus indicating that the solderability of the surfaces of the upper conductor has been maintained. By such a procedure, it can be seen that the top conductor of a multilayered dielectric may always be maintained in solderable condition even though intermediate conductor layers became wetted when firing the next dielectric lamina thereupon.

Once given the above description, many other features, modifications and improvements will become apparent to the skilled artisan. Such features, modifications and improvements are therefore considered to be a part of this invention, the scope of which is to be determined by the following claims.

We claim:

1. A dielectric composition fireable from paste form at about 800°–1000° C. to form a refireable dielectric lamina having a dielectric constant (K) less than 10 and a dissipation factor less than about 0.002 at 25° C. and 1 kHz., said composition printable from paste form into fine lines which maintain their resolution even after firing, said lamina being about 1.5 to 1.8 mils thick, said dielectric composition comprising about 25% by weight of a ceramic powder and about 75% by weight of a lead barium borosilicate glass binder consising of about: 37 weight percent $SiO_2$, 10 weight percent $B_2O_3$ 13 weight percent $Al_2O_3$, 15 weight percent PbO, 2 weight percent $TiO_2$, and 23 weight percent BaO.

2. A dielectric composition according to claim 1 wherein said ceramic powder is zircon.

3. A dielectric composition in accordance with claim 2 wherein the particle size of said zircon and said glass binder ranges from about 0.1 to 20 microns.

4. A dielectric composition in accordance with claim 3 wherein the particle size of said zircon particles is from about 0.1 to about 0.5 micron.

5. A dielectric composition in accordance with claim 4 wherein the particle size of said glass binder is from about 0.5 to 1.0 micron.

6. A paste composition comprising 50 to 10% of a liquid organic carrier vehicle admixed with 50 to about 90% of the dielectric composition of claim 2.

7. A paste composition in accordance with claim 6 wherein said dielectric composition content is about 66.7%.

8. A paste composition in accordance with claim 7 wherein said liquid organic carrier vehicle consists essentially of ethyl cellulose, butyl carbitol acetate and iso-amyl salicylate.

References Cited

UNITED STATES PATENTS

| | | | |
|---|---|---|---|
| 2,864,711 | 12/1958 | Boyce et al. | 106—53 |
| 3,228,548 | 1/1966 | Butler | 106—39 R |
| 3,258,350 | 6/1966 | Martin et al. | 106—47 R |
| 3,394,087 | 7/1968 | Huang | 252—520 |
| 3,437,892 | 4/1969 | Hoffman | 106—53 |
| 3,551,171 | 12/1970 | Thomas | 106—53 |

JAMES E. POER, Primary Examiner

M. L. BELL, Assistant Examiner

U.S. Cl. X.R.

106—39 R, 53, 54; 252—520